United States Patent [19]
Kühnert

[11] Patent Number: 5,552,773
[45] Date of Patent: Sep. 3, 1996

[54] METHOD AND APPARATUS FOR THE PROTECTION OF PEOPLE OR OBJECTS

[76] Inventor: Eduard Kühnert, Sauerbreystrasse 44, 42697 Solingen, Germany

[21] Appl. No.: 347,139

[22] Filed: Nov. 23, 1994

[51] Int. Cl.⁶ ............................. G08B 13/22; G08B 21/00
[52] U.S. Cl. ........................... 340/573; 340/539; 340/568
[58] Field of Search ................................. 340/539, 573, 340/568

[56] References Cited

U.S. PATENT DOCUMENTS

| | | | |
|---|---|---|---|
| 4,675,656 | 6/1987 | Narcisse | 340/539 |
| 4,871,997 | 10/1989 | Adriaenssens | 340/539 |
| 5,053,768 | 10/1991 | Dix, Jr. | 340/539 |
| 5,126,719 | 6/1992 | De Sorbo | 340/571 |

FOREIGN PATENT DOCUMENTS

| | | |
|---|---|---|
| 0073681 | 3/1983 | European Pat. Off. . |
| 0378301 | 7/1990 | European Pat. Off. . |
| 3119112 | 5/1981 | Germany . |
| 3618416 | 5/1986 | Germany . |
| 3733808 | 10/1987 | Germany . |
| 2248331 | 4/1992 | United Kingdom . |
| WO92/02911 | 2/1992 | WIPO . |

*Primary Examiner*—Glen Swann
*Attorney, Agent, or Firm*—Diller, Ramik & Wight

[57] ABSTRACT

An alarm signal is triggered in the event of a prohibited approach or removal of people or objects which affords reliable and unobtrusive protection of such people or objects while retaining unhindered mobility. A signal is transmitted by a transmitter 14 which causes the blockage of an alarm signal until the distance between the transmitter 14 and the receiver 2 is greater or smaller than a predetermined value or the transmission between the transmitter 14 and the receiver 2 is interrupted. It is also possible to gain a representative distance signal corresponding to the distance between the two security elements which causes a corresponding change of pitch or volume of the alarm signal.

10 Claims, 3 Drawing Sheets

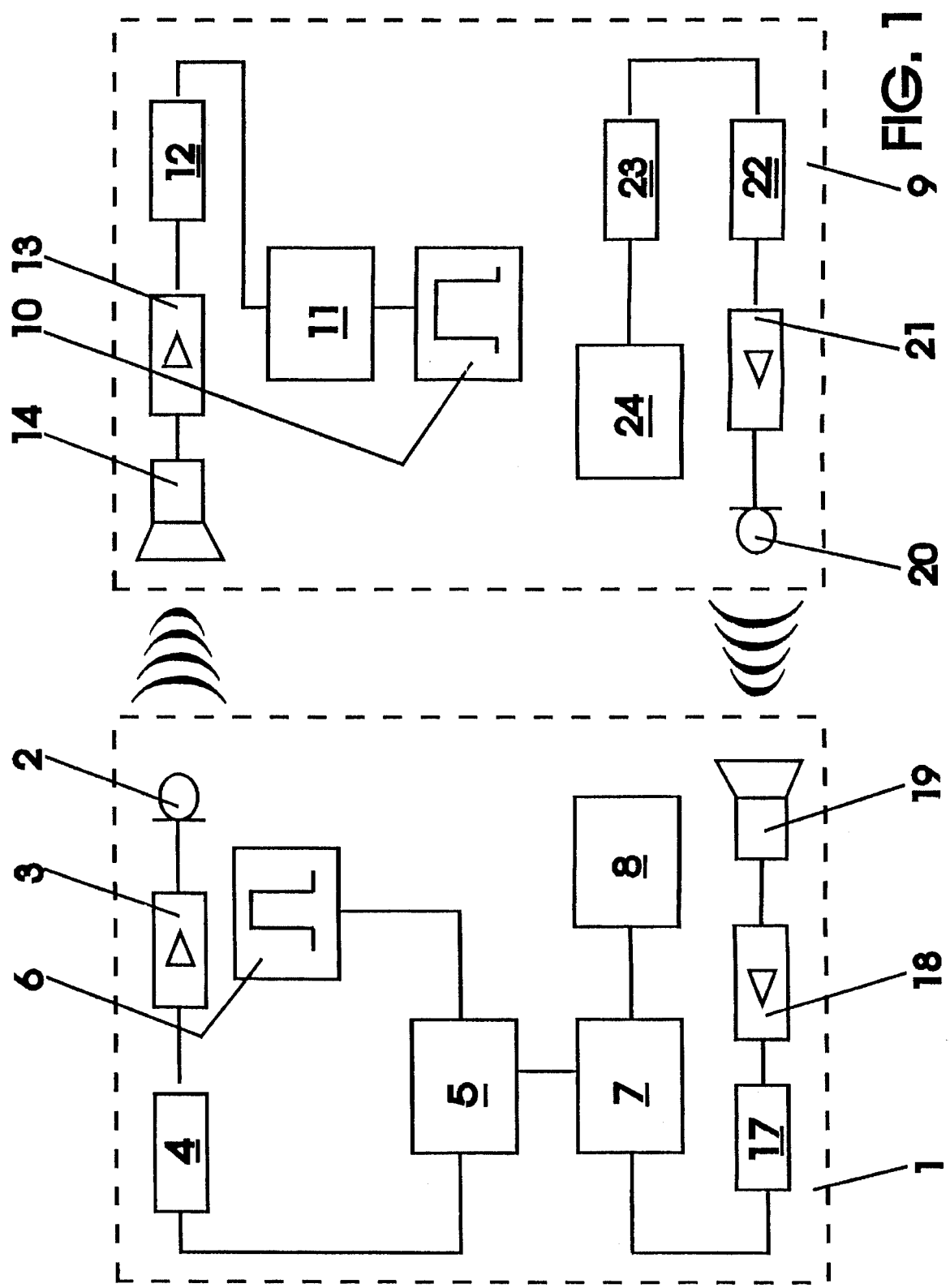

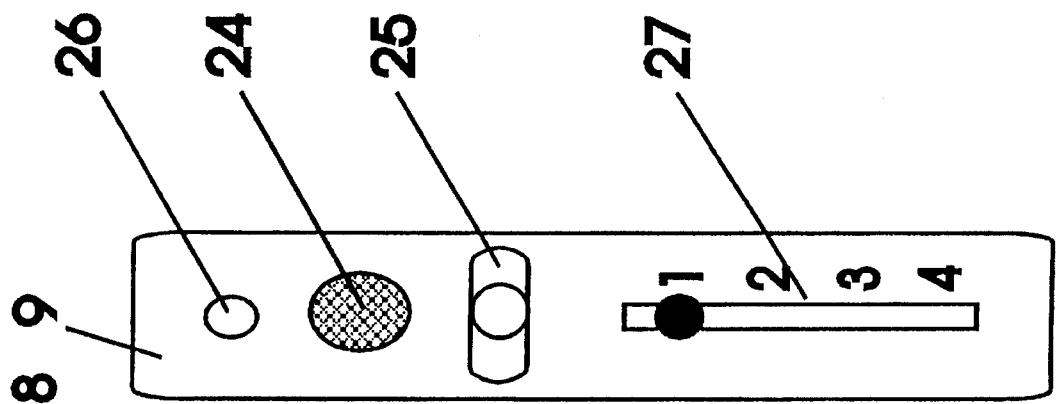
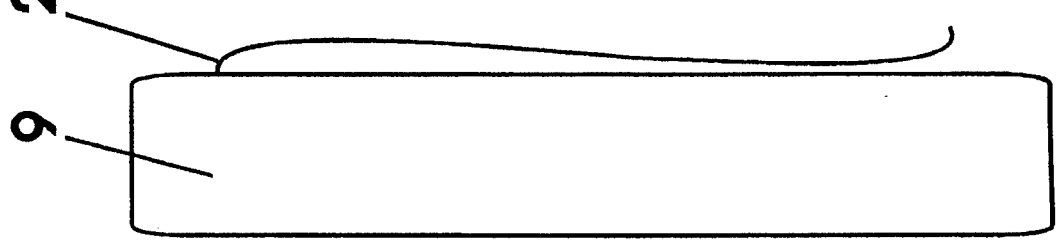
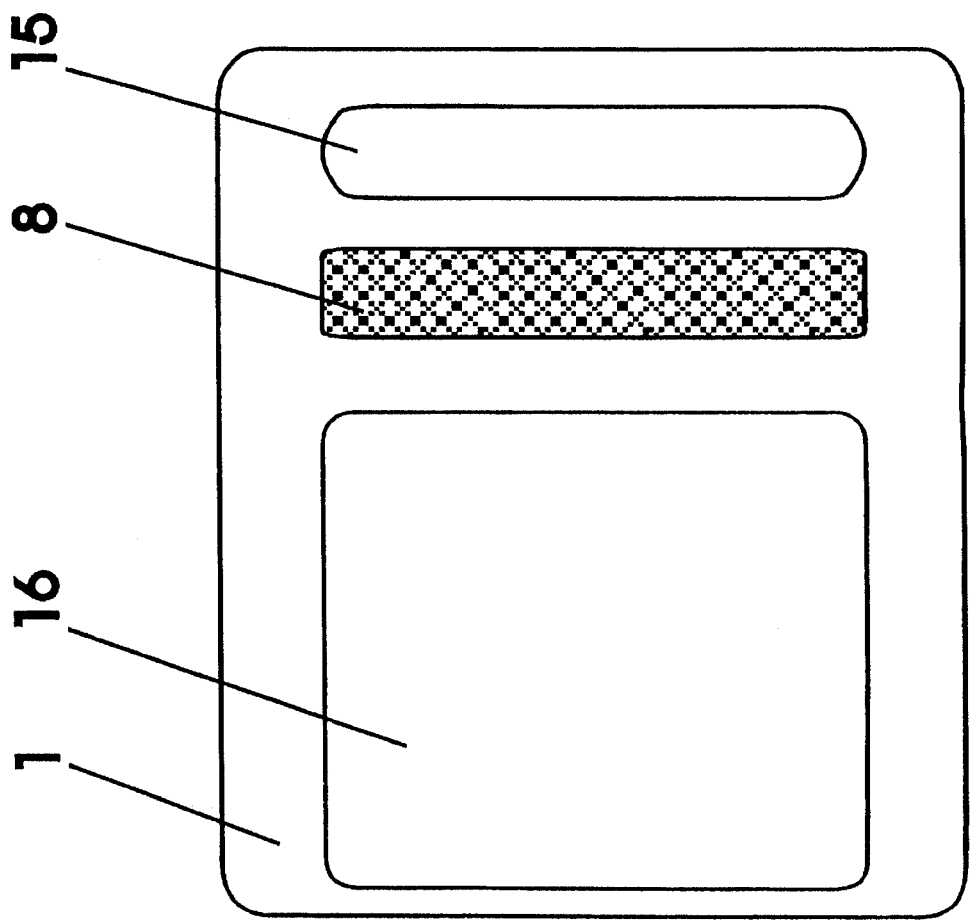

METHOD AND APPARATUS FOR THE PROTECTION OF PEOPLE OR OBJECTS

BACKGROUND OF THE INVENTION

The invention relates to a method of and apparatus for the protection of people or objects whereby an alarm signal is actuated in case of a prohibited approach or removal of people or objects, whereby a signal is transmitted by a transmitter, causing a blockage of the release of the alarm signal until the distance between the transmitter and the receiver falls below or exceeds a predetermined value or in case of an interruption of the transmission between the transmitter and the receiver by means of which a representative distance signal is determined from a reception signal received by a receiver which corresponds to the distance between the transmitter and the receiver and which is compared to a preadjustable reference value, causing the triggering of the alarm signal in case of a positive or negative deviation from said reference value.

Furthermore, the invention relates to an apparatus for the protection of people or objects comprising a first security element which is attachable to the protected object and a second, portable or arbitrarily attachable second security element, where a wireless connection or a wire connection between the first and the second security element exists, and a device for giving the alarm that is located in or close to one of the security elements which is triggered by a change of the distance between the two security elements or by an interruption of the connection.

Different processes and apparatuses concerning the protection of people are known that give an automatically or manually triggered alarm signal.

Such an apparatus in the form of a signaling device is known that is connected to the object to be secured by means of a flexible cord. This device can be activated by means of a personal code. In the activated status this apparatus sounds an alarm signal upon movement of the secured object and therefore of the device takes place.

It is of a disadvantage that every time when the object is to be secured the activation has to be carried out. Next to the fact that this is rather time consuming and that a deactivation has to be carried out, since otherwise unpleasent false alarms are actuated, one often refrains from an activation, so that a protection is not given. For example, in case of a short term set down of luggage at a check-in counter or a railway station, where danger of theft is rather high, the protection is often not carried out for the sake of convenience.

Furthermore, an apparatus is known consisting of a main device and peripheral devices for sinaling. The main device is provided with a power supply and is connected to the peripheral devices for signaling in such a manner that an alarm signal on the main device is triggered if one of the peripheral devices sends a signal to the main device, which is the case, in case of a movement in the environment of detection of the signaling device.

With this apparatus, depending on the field of use, a protection of objects or people can be carried out, but the use is always restricted to a stationary use and only gives signal in case of a movement in the environment of detection. A marking, for example for locating a stolen object, cannot be carried out.

Further alarm devices are known which are preferably used for the protection of doors. To achieve this, two protection elements are used that are fastend to the door or the door frame and connected to one another by means of, for example, a magnetic coupler. If this connection is broken which is the case when the door is opened, an alarm signal is triggered. An activation/deactivation of the alarm apparatus and the turning off of the alarm signal is achieved by means of a personal code. The triggering of the alarm signal can be adjusted with the time lag.

Such an apparatus is usually restricted to a stationary use and usually used for objects that are very near to one another since only this enables the connection of the two security elements.

From the DE-OS 36 18 416 a further apparatus for the surveillance of luggage or the like is known which consists of a first security element, constructed as satellite devices, and a second security element in form of a central unit. The first protection element and the second protection element are in wireless communication.

Therewith, the central unit transmits signals to the satellite devices which cause returning signals to be emitted from the satellite devices which comprise a code corresponding to the satellite device.

This apparatus has the disadvantage that next to a continuous transmission from the satellite devices, which has the disadvantage of a high energy consumption, the central unit can only evaluate if an object is within the area of surveillance or not. If they are outside of the area of surveillance or if the transmission is interrupted, a search for the lost objects is no longer possible.

The known apparatuses generally comprise two security elements which are in wireless communication with one another. Therewith, one security element is arbitrarily attachable to the protected object or to the person that is to be protected and the other protection element is situated in a room that represents the area of surveillance or is carried by a person once to secure the object.

In EP-A-0 073 681 a solution is described with a transmitter, located in a security element, which transmits a pulsing ultrasonic signal to a receiver in a second security element. The apparatus in the second security element functions as a so called transmitter, with which the received signal is amplified and transmitted to the first security element via a transmitter. There, a receiver is present that passes the received impulse signals to an evaluation circuit. There, the received signal is evaluated in such a manner that an integration of the reception impulses takes place which render a preadjusted value within a predetermined time span. This is normally the case when the distance between tile two security elements is too large or the connection is interrupted.

The surveillance-alarm system according to GB-A-2 248 331 functions in a similar manner. Hereby, a request signal from the base unit is sent to a portable transmission unit. This transmits a signal to the receiver in the base unit that evaluates a distance signal from the reception signal, which corresponds to the distance between the base station and the transmission unit. After comparison with the preadjusted value an alarm is actuated if a distance is evaluated that is greater than the preadjusted value.

The U.S. Pat. No. 4,871,997 describes an approach-sensor-apparatus. Hereby, it is possible to miniaturize the security elements, at least one security element, down to a size of a credit card. This apparatus also consists of two parts. One part is carried in a brief case, a wallet or another object that is to be secured. The other part is, for example, attached to a belt, so that alarm is triggered if the brief case or wallet is out of reach.

SUMMARY OF THE INVENTION

A transmission device is provided in the first security element which includes an oscillatory circuit for the emission of the timely defined pulsed electromagnetic signal. A reception device is provided in a second security element which includes means for the evaluation of the timely defined pulsed electromagnetic signal. Furthermore, logical elements are provided therein, with which the pulse signal is handled. Finally, the second security element includes an alarm circuit that is triggered by the logic elements if the reception device is taken out of reach of the transmission device and if the said evaluation device no longer receives a pulse signal.

With such an apparatus it is possible to avoid the transmission of a feedback signal. Since the transmission of a signal is usually a rather energy consuming process, this apparatus avoids space consuming energy sources in the reception device. Therefore, a miniaturization down to the size of a credit card can be achieved.

A disadvantage of all known solutions is that the alarm signal is immediately triggered in its full extent in case the security distance is exceeded. Should this alarm signal be frequently triggered by minor transgressions, this will cause the alarm signal to be quickly ignored. Then the alarm signal will also be ignored if an actual alarm status is at hand.

In addition, the known solutions do not give the possibillity to determine where the stolen or lost object is situated. In this manner it is, for example, possible that the stolen or lost object beeing searched for and a localisation is not possible without difficulty.

It is therefore the task of the invention, to make the urgency apparent by a triggering of the alarm and to simplify the finding of a lost or stolen object.

According to the invention this task is solved by a method of which the distance signal causes a corresponding change in pitch or volume of the alarm signal.

By changing the pitch or the volume of the alarm signal according to the magnitude of the distance signal a greater accuracy in the perception of the alarm signal or in the realization of the urgency of the alarm signal is achieved. In this manner, for example, the volume increases if the object is taken from the predetermined range or if a person to whom the first security element is attached comes close to a predetermined distance area, e.g. a safety zone.

In a advantageous embodiment of the invented method the distance signal is obtained by a measurement of the level of the reception signal and by calculating the difference with the value of a known transmission signal.

This version requires little effort for the evaluation of the signal representing the distance, since mostly easily detectable signal changes, e.g. changes of amplitude, caused by a distance increase or decrease, are utilized.

A further possibillity for acquiring a distance signal is by measuring the time difference between the point of transmission and the point of reception. In doing so, the transmitter and the receiver are pulsed synchronously. Therewith, the time difference between the occurrence of a reception signal and the time of transmission, which is also known to the receiver due to the synchronized pulse generation, can be measured.

If the signal is sent intermittently it is possible to always have the same time interval between two transmissions. The generation of the signal corresponding to the change of distance is achieved by measuring the interval of the reception signal and comparing it with the preceeding interval.

The change of the signal due to the change of distance then causes a corresponding change of the pitch or volume of the alarm signal according to its value.

In a very advantageous embodiment of the invented method an additional transmission signal is sent from an additional transmitter, located close to the receiver, to an additional receiver, located close to the transmitter. An additional distance signal corresponding to the distance between the transmitter and the receiver is evaluated by means of this additional transmission signal, which causes a corresponding change of pitch or volume of the alarm signal triggered by the additional transmission signal.

Normally, the first security element is fastened to the protected object or to a person that is to be secured and the second security element is either stationary or is carried by a guarding person. Therewith, it is of interest to design the first security element as unobtrusively as possible, avoiding a high energy consumption that would make space consuming batteries necessary. Since, on the other hand, the alarm signal should also be audible on the second security element, which is for example carried by a guard, the additional transmitter, which is preferably located in the first security element, can give an additional alarm signal by means of a second security element, preferably located in the additional receiver. According to the invention this is only the case if the first security element is actuated to give an alarm signal, which will be the case if the transmission is interrupted or by exceeding the preadjusted distance. The first security element will only, and only then, be induced to perform the energy consuming transmission if the signaling of the alarm signal is necessary. Therefore, the first security element is normally switched to its reception mode, which causes little energy consumption.

Furthermore, a version of the invented method provides for a coded control signal that is switchably interconnected with the transmission signal, causing the additional transmission signal to be transmitted continuously or intermittently.

Due to this advantageous embodiment, it is possible to, for example, switch to search mode in the second security element in which a necessary means modulate the coded control signal upon the transmission signal which, for example, cause a continuous or intermittent transmission of the additional transmission signal by the first security element when the actuation of the additional transmission signal is necessary.

If the search mode is not desired the modulation of the coded transmission signal is not performed and it is furthermore sufficient that the additional transmission signal is only for a short time sent to an additional receiver located, for example, in the second security element where this short occurence of the additional transmission signal is sufficient to actuate the alarm signal.

The task is furthermore solved by an apparatus for the protection of people or objects comprising a second transmitter located in the first security element and a corresponding second receiver located in the second security element, which is connected to the second device to give alarm. Between the second receiver and the second device to give alarm there are means to produce an additional distance signal and a modulations circuit, connected therewith, for the modulation of the second device to give alarm.

A preferred embodiment of the invented apparatus comprises a codification circuit with an outwardly located switch which is, by means of the transmission signal, in connection with an activation circuit in the first security element to activate the continuous transmission of the additional transmitter.

BRIEF DESCRIPTION OF THE DRAWINGS

In the following, the invention shall be illustrated more closely by means of an example. The accompanying drawings show FIG. 1 is a schematic depiction of the assembled invented apparatus;

FIG. 2 is a view of the invented apparatus with said first and said second security elements which are shown in front and side view;

DESCRIPTION OF THE PREFERRED EMBODIMENTS

Figure 3:
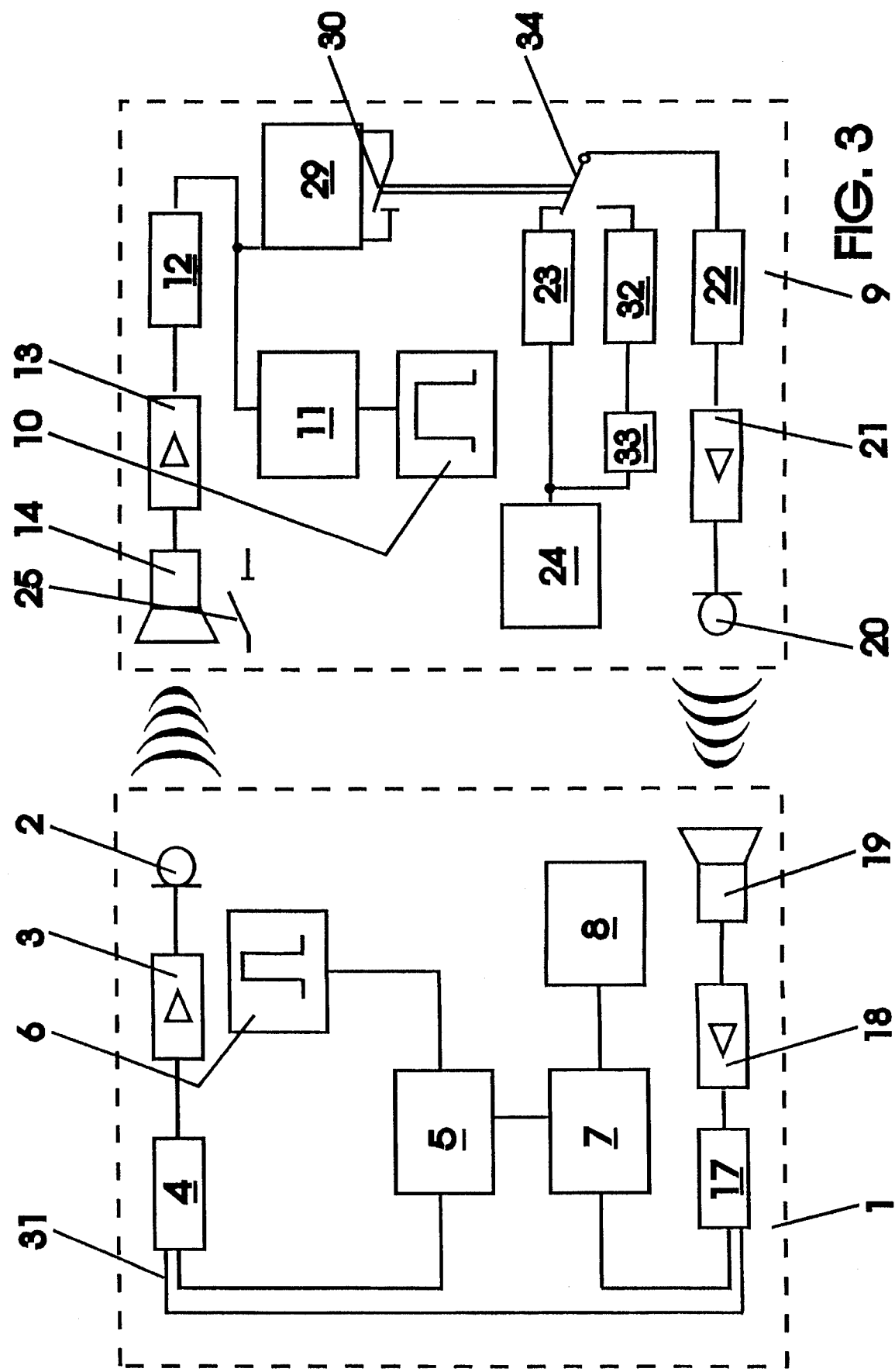
FIG. 3 is a schematic depiction of the assembled invented apparatus, and illustrates change-over circuitry for effecting "surveillance" and "search" modes of operation of the secondary security element.

The first security element is provided with an ultrasonic sensor 2 that is connected to a decoder 4 by means of an amplifier 3. The output of the decoder 4 is connected to the reset input of the counter 5. This counter 5 is connected to a synchronous pulse generator 6 on its counter input. By this the impulse generated by the synchronous pulse generator 6 is counted until the decoder 4 gives an impulse to reset the counter 5. This causes the counter 5 to restarts counting from the beginning.

Only when the counter 5 overflows it gives a signal to the counter output which is connected to the circuit for triggering the alarm 7. In this manner, an acustic generator of the alarm signal 8 is acutated and the alarm signal in the first security element is sounded.

A synchronous pulse generator 10, provided in the second security element 9, agitates an ultrasonic generator 11 in predetermined time spans. A coding device 12 performs the codification of the ultrasonic signal which is transmitted to an ultrasonic transducer 14 via an amplifier 13 of which it is transmitted to the ultrasonic sensor 2 of the first security element 1 if the distance between the first security element 1 and the second security element 9 is only so big, as to insure a proper reception.

The first security element has the shape of a credit card. It is therewith possible to put it in a bag, for example a brief case, that is to be secured. Due to the slot 15 (FIG. 2) the first security element can also be used as a luggage tag or the like. For this purpose it is also provided with an address field 16, which reduces its conspicuousness.

The generator for the alarm signal 8 is directed towards the outside of the device to make the alarm signal audible without difficulty.

The circuit to trigger the alarm 7 is furthermore provided with a second ultrasonic generator that creates a coded ultrasonic signal which is directed to a second ultrasonic transducer 19 via an amplifier 18.

This ultrasonic signal has a much larger amplitude than the ultrasonic signal of the ultrasonic transducer 14 due to the amplifier greatly increasing its range. When an alarm signal is received by the first security element, that is if the ultrasonic sensor 2 no longer receives an ultrasonic signal, a second ultrasonic sensor 20 with a following amplifier 21 and a decoder 22 can trigger a second circuit to trigger the alarm located in the second security element, which causes the second security element 9 to sound its alarm signal.

The second security element 9 is spaciously much larger since the energy consumption, supplied by space consuming batteries, is much larger. The energy consumption of the first security element 1 is much smaller, since it only uses transmission power in case an alarm signal is sounded. This power can be provided by miniature battery cell.

The second alarm signal generator 24 is also directed towards the outer side of the second security element 9. In addition it is comprises an on/off-switch 25 (FIG. 2) with which the second security element 9 can be turned off. When utilizing the switch 25 it is advisable to send a coded switching signal to the first security element which blocks the circuit to trigger the alarm 7 up to the moment until a further activation inpulse, which is transmitted when activating the switch 25, returns it to the correct operation status.

As not shown in the drawings, it is of course further possible to provide a second on/of-switch on the first security element which can also be realized by a coding switch.

The second security element 9 is comprises means to signal its state of readyness in form of a light emitting diode that is illuminated when the security element is turned on or the power supplied by the battery falls below a minimum value. It is also possible to utilize a two colored light emitting diode (LED) that can fullfill both functions at the same time or to have a second light emitting diode.

By means of a potentiometer 27 (not shown in FIG. 1) the amplification of the amplifier 3 can be adjusted to regulate the strength of the sent ultrasonic signal making it possible to indirectly determine the distance at which the alarm signal is actuated.

The second security element 9 can be attached with a clip 28. The explained realization of the invention was especially described for the surveillance of luggage. Especially, if other means of transmission are utilized the spane of possible applications is much larger.

The utilization of the invention on a car key and a car, for example, can be used to warn the driver if he has forgotten to lock his car when he is leaving his car or, in fact, to carry out the locking of the car automatically if the device to give the alarm signal is combined with an automatic locking system for the car.

In a similar manner the utilization in housing, condominiun, and hotel doors is conceivable.

Children and baby carrages can be secured. In addition, an application on living animals, for example with dogs, is possible.

Next to the mentioned theft protection of merchandise, preferably in shopping centers, a surveillance of people in buildings is also possible to, for example, hinder visitors of a company to enter in certain zones. They can carry a second security element 9, not recognized as such, which is at the same time an entrance ticket.

As shown in FIG. 3 the first security element 1 is provided with an ultrasonic sensor to that is connected to the decoder 4 via an amplifier 3. The output of the decoder 4 is connected to the reset output of the counter 5. This counter 5 is connected to the synchronous pulse generator 6 on its counter input. By this the impulses created by the synchronous pulse generator 6 are counted until the decoder 4 gives an impulse to reset said counter 5. The counter 5 then begins to recount from the beginning.

Only when the counter 5 overflows does the counter output, which is connected with the circuit for triggering the alarm signal 7, activate said circuit. Therewith, an acustic alarm signal generator 8 is switched on and an alarm signal sounds from the first security element 1.

A synchronous pulse generator 10 is provided in the second security element 9 that agitates the ultrasonic generator 11 in certain time spans. A codification device transforms the ultrasonic signal into a coded signal that is passed to the ultrasonic transducer 14 via an amplifier 13 which then emits it to the ultrasonic sensor 2 of the first security element 1, if the distance between the first security element 1 and the second security element 9 is just so big as to insure reception. The circuit to trigger the alarm 7 is furthermore provided with a second ultrasonic generator 17 which creates a coded signal that is passed to an ultrasonic transducer 19 via an amplifier 18.

This ultrasonic signal has an much greater amplitude than the ultrasonic signal of the ultrasonic transducer 14 due to the higher amplification, giving it a much greater range. With the occurence of an alarm signal on the first security element 1, i.e., when the ultrasonic sensor 2 no longer receives an ultrasonic signal, an ultrasonic sensor 20 with a succeding amplifier 21 and a decoder 22 clear the device to trigger the alarm 23 that activates the second alarm signal generator 24, sounding an alarm signal in the second security element 9.

In addition, the codifier 12 is connected to a control signal transmitter 29. This control signal transmitter 29 can be activaded via a switch 30 which causes a control signal to be modulated upon the transmission signal inside the codifier 12 and to be passed to the ultrasonic transducer 14 via the amplifier 13.

This control signal is received by the ultrasonic sensor 2 in the first security element and is passed to the decoder 4 via the amplifier 3, causing a direct control wire 31 to be activated and turning the second ultrasonic generator 17 on. Therewith, an additional ultrasonic signal is transmitted to the second ultrasonic sensor 20 in the second security element 9 via the amplifier 18 and the ultrasonic transducer 19.

A distance measurement circuit 32 and a therewith switchably connected modulator 33 are provided in the second security element 9 in between the decoder 22 and the second alarm signal generator 24.

In this connection a change over switch 34 which is coupled to the switch 30 gives the possibility to switch from the mode "surveillance" to the mode "search" by utilizing the switch 30 and therewith bringing the signal over switch 34 in a different position than shown in the drawing in case of a purposely ment search of an object, to which the first security element is attached. The control signal transmitter therewith creates a control signal, causing the continuous or intermittent transmission of an additional transmission signal which is a evaluated in a distance measurement circuit 32 and passed to the modulator 33 in form of a distance measurement signal that modulates the pitch or the amplitude in the second alarm signal generator according to the adjusted distance.

What is claimed is:

1. A method of protecting people or objects by which an alarm signal is triggered in case of a prohibited approach or removal of people or objects comprising the steps of transmitting a signal, by a transmitter to a receiver determining therefrom a distance signal representative of the distance between the transmitter and the receiver; blocking the actuation of an alarm signal until the distance signal is decreased to or exceeds a predetermined value, or the transmission between the transmitter and the receiver is interrupted; and the method being characterized in that the distance signal causes a corresponding variation in pitch or volume of the actuated alarm signal.

2. The method of protecting people or objects according to claim 1, characterized in that the distance signal is evaluated by a measurement of the level of the received signal and a difference from the known level of the transmitted signal is calculated.

3. The method of protecting people or objects according to claim 1 characterized in that the distance signal is determinated from the time difference between transmission and reception of the signal.

4. The method of protecting people or objects according to claim 3 characterized in that it comprises employing mutually synchronized pulse generation for transmission and reception of said signal, which determines the time of transmission and that the time difference between the occurrence of the reception of said signal and the time of transmission (which is also known to the receiver due to the mutually synchronized pulse generation) is measured.

5. The method of protecting people or objects according to claim 1 characterized in that the signal is transmitted intermittently, and that the interval between two transmissions of the signal is always the same and that the change of the signal due to the change of distance is obtained by measuring the time span between consecutive receptions of the signal and comparing it to the preceding time span, and that the change of the signal due to the change of distance causes a corresponding change of pitch or volume of the alarm signal.

6. The method of protecting people or objects according to claim 1 characterized in that an additional transmitter located close to the receiver transmits an additional signal to an additional receiver located close to the transmitter by which a representative distance signal corresponding to the distance between the transmitter and the receiver is determined, which causes a corresponding change of pitch or volume of an alarm signal actuated by the additional transmission signal.

7. The method of protecting people or objects according to claim 6 characterized in that a coded control signal is modulated upon the transmission signal, in response to which the additional transmission signal is transmitted continuously or intermittently.

8. An apparatus for the protection of people or objects with a first security element (1), which is attachable to an object or a person, and a portable and arbitrarily fastenable second security element (9) wherein a wireless connection between the first and second security elements exists, and a device to give an alarm actuated by a change of distance between the two security elements or by an interruption of the connection, characterized in that the first security element (1) comprises a transmitter (19), a corresponding receiver (20) located in the second security element (9) being connected to a second device to give an alarm (24), the second security element (9) further comprising means (32) for producing a distance signal corresponding to the distance between the receiver (20) and the transmitter (19) to give an alarm (24), and a modulation circuit (33) to modulate a second alarm signal with said distance signal.

9. The apparatus for the protection of people or objects according to claim 8 characterized in that the second security (9) element comprises a coding circuit (29) with a switch (30) which triggers an activation circuit (31) in the first security element (1) via a wireless signal to activate the continuous transmission of the transmitter (19).

10. A method of protecting people or objects by which an alarm signal is triggered in case of a prohibited approach or removal of people or objects comprising the steps of transmitting a signal by a transmitter to a receiver; determining therefrom a distance signal representative of the distance between the transmitter and the receiver; blocking the actuation of an alarm signal until a distance signal corresponding to the distance between the transmitter and the receiver is determined and compared to a preadjustable reference value and a positive or negative deviation from the reference value causes the release of the alarm signal, and the method being characterized in that the distance signal causes a corresponding variation in pitch or volume of the actuated alarm signal.

* * * * *